United States Patent [19]
Jahnke

[11] 3,831,456
[45] Aug. 27, 1974

[54] LINEAR ACTUATOR WITH LOCK
[75] Inventor: William R. Jahnke, Cincinnati, Ohio
[73] Assignee: KMS Industries, Inc., Ann Arbor, Mich.
[22] Filed: Apr. 13, 1973
[21] Appl. No.: 350,773

[52] U.S. Cl. .................................. 74/110, 92/24
[51] Int. Cl. ............................................ F16h 21/44
[58] Field of Search ........................... 74/110; 92/24

[56] References Cited
UNITED STATES PATENTS

| | | | |
|---|---|---|---|
| 3,342,111 | 9/1967 | Reyster | 92/24 |
| 3,511,048 | 5/1970 | Nemetz | 92/24 |
| 3,534,621 | 10/1970 | D'Ascenzo, Jr. | 74/110 |
| 3,584,544 | 6/1971 | Haberman | 92/24 |

*Primary Examiner*—Samuel Scott
*Assistant Examiner*—Wesley S. Ratliff, Jr.
*Attorney, Agent, or Firm*—Barnes, Kisselle, Raisch & Choate

[57] ABSTRACT

A linear actuator with a reciprocable ram having a transversely movable wedge slidably received thereon for locking the ram in a range of extended positions. Both the ram and wedge are driven through a floating element received in the wedge for rotation on an axis generally perpendicular to the axis of both the ram and wedge to eliminate backlash of the ram when locked in the extended position.

18 Claims, 6 Drawing Figures

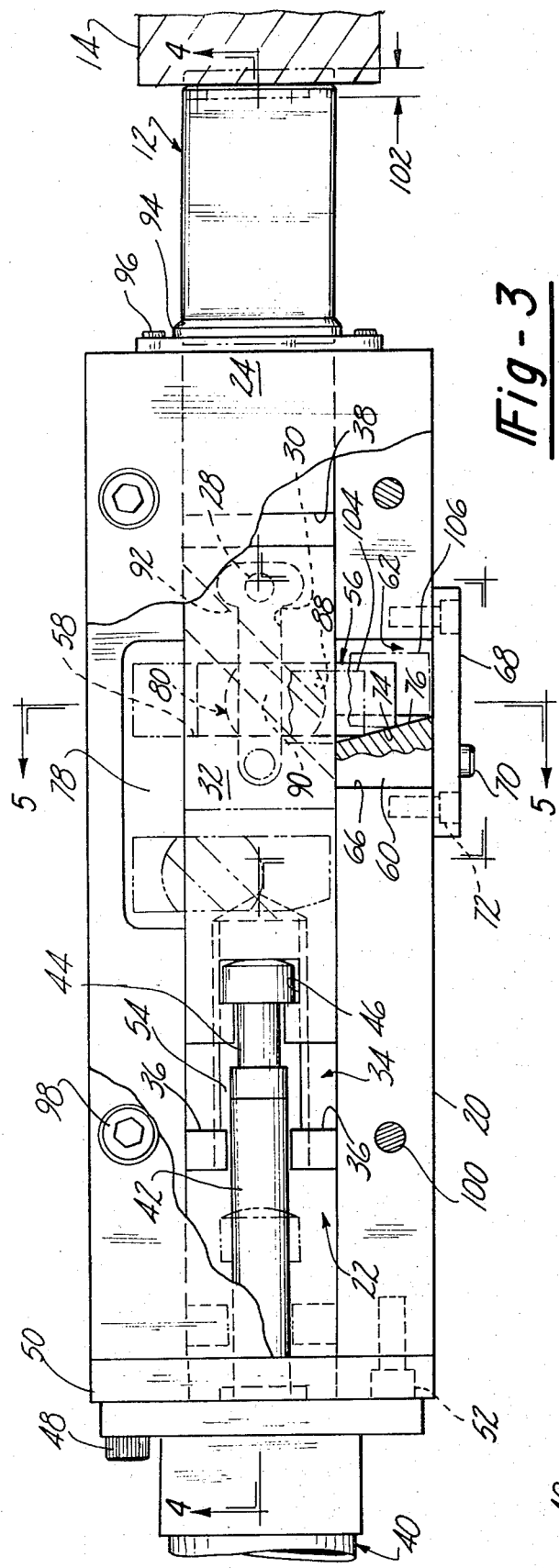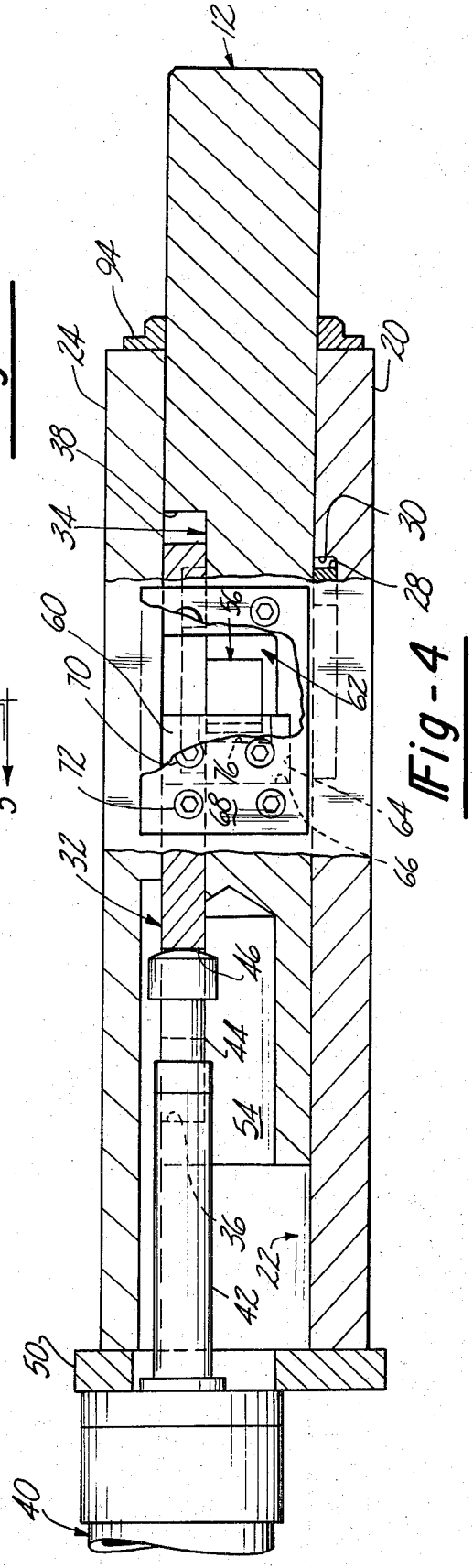

LINEAR ACTUATOR WITH LOCK

This invention relates to actuating devices and more particularly to such devices with extendable and retractable driven members which can be locked in the extended position.

Linear actuators with a locking element movable transversely of the driven extendable and retractable member are known. One such actuator is shown in D'Ascenzo U.S. Pat. No. 3,534,621, dated Oct. 20, 1970 and another is shown in Jahnke patent application Ser. No. 138,434, filed Apr. 29, 1971.

Objects of this invention are to provide a linear actuator which will automatically lock the driven member in a range of extended positions to prevent retraction thereof by a reaction force acting thereon, eliminates backlash of the driven member when locked in an extended position and is rugged, durable and substantially maintenance free.

These and other objects, features and advantages of this invention will be apparent from the following specification, appended claims and accompanying drawings in which:

FIG. 3 is a fragmentary top view of the linear actuator of FIG. 1 with portions broken away to illustrate the component parts in assembly.

Figure 5:
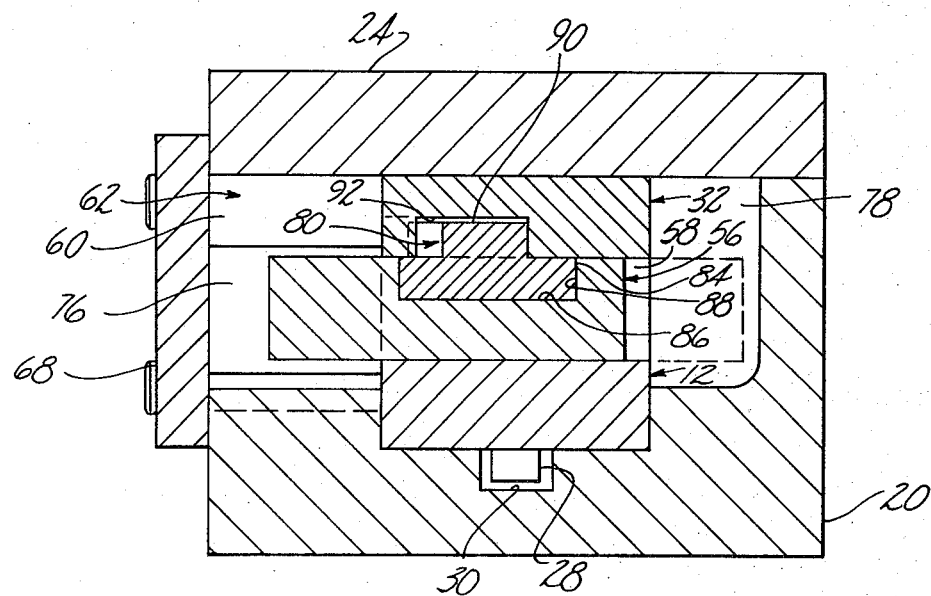

FIGS. 4 and 5 are sectional view on lines 4—4 and 5—5 respectively of FIG. 3.

Figure 1:
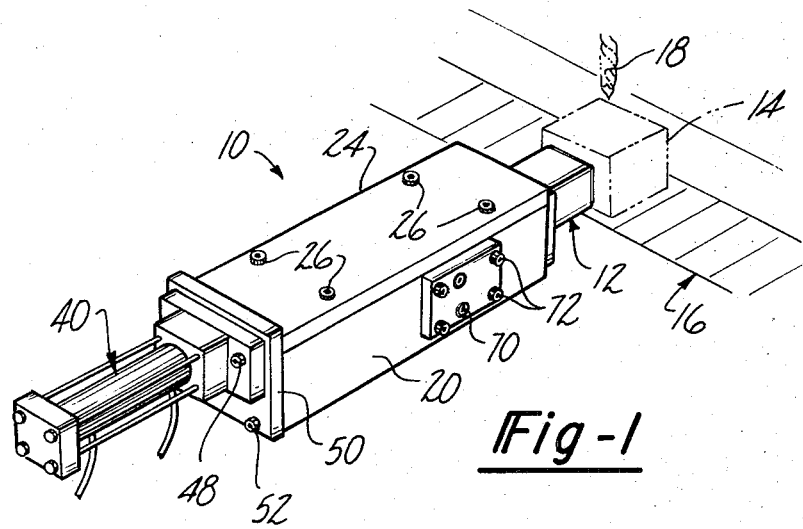
FIG. 1 is an isometric view of a linear actuator embodying this invention clamping a workpiece in a fixture for machining the workpiece.
Figure 6:
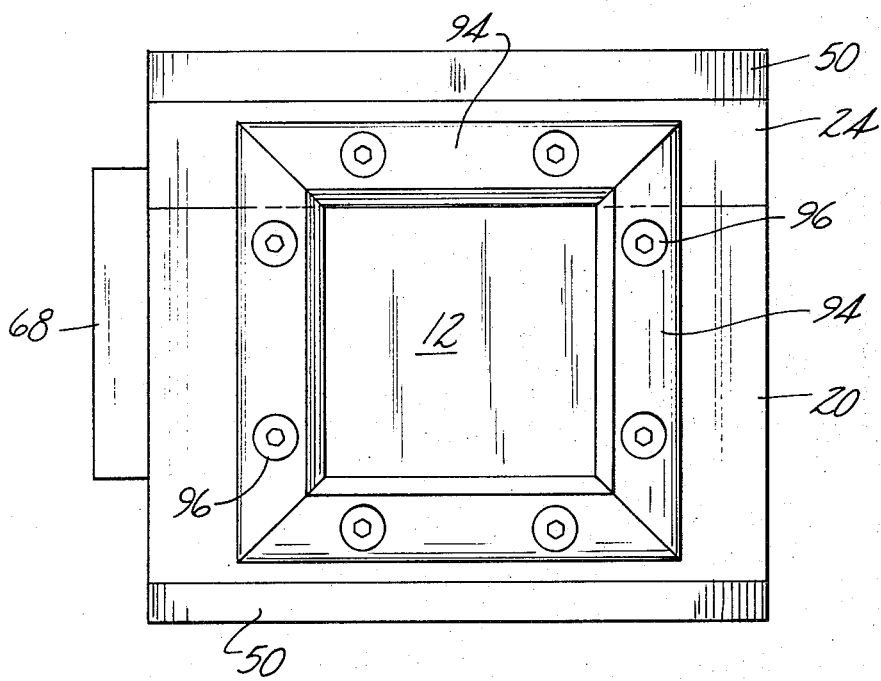

FIG. 6 is a view of the front end of the linear actuator of FIG. 1.

Figure 2:
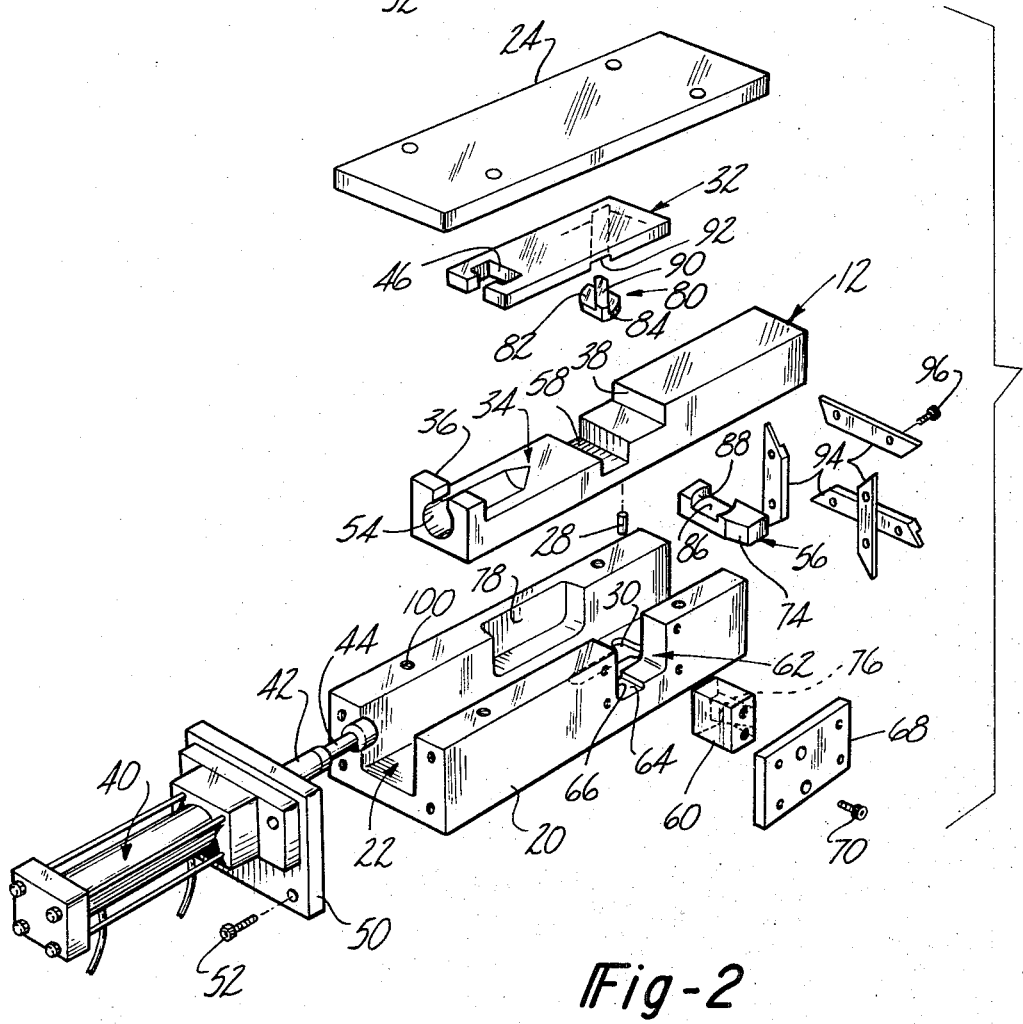
FIG. 2 is an enlarged exploded view of the component parts of the linear actuator of FIG. 1.

FIG. 1 illustrates a linear actuator 10 embodying this invention with a driven member or ram 12 clamping a workpiece 14 in a fixture 16 for boring a hole in the workpiece with a drill 18 driven by a drill press (not shown). Linear actuator 10 has a housing 20 with a large groove 22 therethrough which in cooperation with a cover plate 24 defines a rectilinear passage in which ram 12 is slidably received for generally axial reciprocation to extended and retracted positions in the housing. Cover plate 24 is secured to housing 20 by a plurality of cap screws 26. Ram 12 is retained in housing 20 by a pin 28 (FIGS. 2 and 5) fixed thereto which extends into a generally T-shaped pocket 30 in the bottom wall of groove 22. A drive member or plate 32 is slidably received in a recess 34 in ram 12 for axial movement relative thereto. Generally opposed faces 36 and 38 of recess 34 provide stops limiting the axial displacement of drive plate 32 relative to ram 12.

Drive plate 32 is reciprocated in housing 20 by a fluid actuated cylinder 40 with a piston rod 42 connected to drive plate 32 by a quick change coupler 44 received in a T-slot 46 in drive plate 32. Cylinder 40 is mounted by cap screws 48 on an end plate 50 fastened to the back end of housing 20 by cap screws 52. Clearance for piston rod 42 is provided in ram 12 by a generally axially extending bore 54 therein which opens into recess 34 thereof.

Ram 12 is locked in the extended position by a locking element or wedge 56 slidably received in a groove 58 extending transversely through the ram and movable to retracted and extended positions. When extended, wedge 56 bears on a stop block 60 received in an opening 62 in a side wall of housing 20. Stop block 60 is seated in a recess 64 in opening 62 in engagement with an end wall 66 thereof by a retainer plate 68 fastened to stop block 60 by cap screws 72 and secured to housing 20 by cap screws 72. Wedge 56 has a cam surface 74 thereon adapted for engagement with a mating abutment surface 76 on stop block 60 when the wedge is extended into pocket 62. To provide locking engagement of cam surface 74 with abutment surface 76, these surfaces preferably form an acute angle with the axis of reciprocation of wedge 56 of less than about 15° and preferably in the range of 7° to 10° if the wedge and stop block are of case hardened steel. A blind pocket 78 in a side wall of housing 20 provides clearance for wedge 56 which is retracted so that ram 12 can be shifted axially in the housing.

Drive plate 32 is operably connected to wedge 56 and ram 12 by a floating element 80 carried by the wedge. Floating element 80 has a body 82 with cylindrical side wall portions 84 which is received in a pocket 86 with mating cylindrical side wall portions 88 in wedge 56 for rotation on an axis perpendicular to both the axes of the wedge and ram 12. Body 82 has a key 90 thereon which is slidably received in a groove 92 extending obliquely across drive plate 32. Preferably, the width of groove 92 is greater than the width of key 90 to allow drive plate 32 to move axially with respect to floating element 80 to impart a hammer-like blow thereto which facilitates retracting wedge 56 from engagement with stop block 60. Groove 92 should be at an acute angle to the axis of reciprocation of drive plate 32 in a range of about 30° to 60° and preferably at about 45°.

To prevent dust, machining coolants, chips and other contaminants from entering housing 20, urethane wiper seals 94 are secured to the front end of housing 20 by cap screws 96 as shown in FIG. 6. These urethane seals also retain a lubricant within housing 20. A substantial quantity of lubricant can be retained in pockets 30 and 78 and opening 62 in housing 20 so that linear actuator 10 seldom needs lubrication.

Linear actuator 10 is mounted to clamp a workpiece 14 in a fixture 16 by cap screws 98 (FIG. 3), extending through holes 100 in housing 20 so that when extended, ram 12 will bear on the workpiece when wedge 56 is aligned with pocket 62 to bear on stop block 60. A fluid under pressure is supplied to cylinder 40 to reciprocate drive plate 32 in housing 20. With drive plate 32 and ram 12 in the fully retracted position shown in phantom in FIG. 3, as cylinder 40 extends drive plate 32, ram 12 will be moved toward its extended position since wedge 56 is prohibited from being extended transversely outwardly by the side wall of the housing. When ram 12 bears on workpiece 14, drive plate 32 advances relative to the ram to extend wedge 56 to lock the ram in its extended position. Advancement of drive plate 32 relative to ram 12 causes a side face of groove 92 bearing on key 90 to cam wedge 56 transversely outwardly of ram 12 to urge cam face 74 of the wedge into firm engagement with abutment surface 76 of stop block 60, thereby locking ram 12 in firm engagement with workpiece 14. Ram 12 is retracted by movement of drive plate 32 toward its retracted position by fluid actuated cylinder 32. Lost motion between drive plate 32 and floating element 80 due to the width of groove 92 being greater than the width of key 90 allows the drive plate to be initially retracted without any load thereon and to impart a hammer-like blow to floating element 80 to initially break wedge 66 away from engagement with stop block 60. Thereafter, further retraction of drive plate 32 with respect to ram 12 retracts wedge 56 from pocket 62 to fully unlock and release ram 12 and then the drive plate and ram are fully retracted in unison by cylinder 32.

As shown in FIG. 3, ram 12 can be locked by wedge 48 anywhere within the range 102 of extended positions. The position assumed by wedge 56 at the extremes of range 102 is shown in phantom in FIG. 3 at 104 and 106 respectively and the position assumed by the wedge at an intermediate position of ram 12 is shown in solid lines. The extent of range 102 in which ram 12 can be locked is primarily dependent on the rate at which wedge 56 is advanced into pocket 62 and the generally axial width of cam surface 74 of the wedge in relation to the axial width of the abutment surface 76 of stop block 60 which can be varied to provide different values for range 102. A minimum axial length of range 102 in which ram 12 can be locked of approximately 0.12 of an inch is believed to be desirable and actuator device with ranges 102 between 0.18 to 0.4 of an inch have proved highly satisfactory.

Floating element 80 eliminates all of the backlash of ram 12 with respect to housing 20 when the ram is locked in its extended position by wedge 56. Floating element 80 is believed to eliminate all backlash of the locked ram because all of the force driving both the ram into its extended position and the wedge into locking position is transmitted through the floating element which simultaneously allows both the wedge and ram to shift or cock with respect to the drive plate as the ram is extended and locked. Regardless of the theoretical explanation, it has been found in practice that floating element 80 eliminates backlash of the locked ram and thus improves the accuracy of clamping a workpiece in a fixture.

The movable wedge arrangement of this invention for locking the ram provides a linear actuator in which the ram can be locked in a range of extended positions to prevent retraction thereof by a reaction force acting thereon such as when the actuator is used to clamp a workpiece in a fixture. The floating element arrangement of this invention eliminates backlash of the ram and thus improves the accuracy with which fixtures utilized with this linear actuator can locate a workpiece therein. The comparatively heavy duty wedge and ram provide a rugged and durable linear actuator embodying this invention which is substantially maintenance and service free. The arrangement of the housing cover, stop block, retainer plate, and hydraulic cylinder so they can be removed from the housing without disturbing the drive plate, ram and wedge provides a linear actuator embodying this invention which can be readily serviced and maintained without being removed from the device on which it is mounted.

I claim:

1. A linear actuator comprising a housing, a driven member carried by said housing for generally axial reciprocation to extended and retracted positions with respect to said housing, a drive member carried by said housing for reciprocal movement with respect to said housing to first and second spaced apart positions on an axis generally parallel with the axis of reciprocation of said driven member, a locking element carried by one of said members for movement to extended and retracted positions on an axis generally transverse to the axis of said driven member, an abutment fixedly carried by said housing, said locking element in its extended position bearing on said abutment to prevent said driven member from moving toward its retracted position and in its retracted position disengaging said abutment and releasing said driven member for movement toward its retracted position, a floating element carried by said locking element for rotation in relation thereto on an axis generally perpendicular to the axes of reciprocation of both said one member and said locking element, a first cam and a cam follower each carried by one of said floating element and the other of said members for operably interconnecting said floating element with the other of said members for moving both said driven member to its said extended position and shifting said locking element to its said extended position to lock said driven member in its extended position in response to said driving member moving to its said second position and also sequentially moving said locking element to its retracted position to unlock said driven member and said driven member to its retracted position in response to movement of said driving member from its said second to its said first position, whereby backlash between said driven member and said housing is eliminated when said driven member is locked in its extended position by said locking element.

2. The actuator of claim 1 wherein said locking element has a second cam surface inclined with respect to the axis of said driven member which engages a mating surface on said abutment carried by said housing when said locking element is in its extended position to prevent said driven member from moving toward its retracted position.

3. The actuator of claim 2 wherein said second cam surface is inclined at an acute angle of not more than 15° with respect to the axis of reciprocation of said locking element.

4. The actuator of claim 2 wherein said second cam surface is inclined at an acute angle in the range of about 7° to 15° with respect to the axis of reciprocation of said locking element.

5. The actuator of claim 2 wherein said second cam surface and said mating surface of said abutment have a sufficient width in the generally axial direction of reciprocation of said locking element for locking engagement over a range of extended positions of said driven member, whereby said driven member can be locked in a range of extended positions.

6. The actuator of claim 3 wherein said second cam surface and said mating surface of said abutment have a sufficient width in the generally axial direction of reciprocation of said locking element for locking engagement over a range of extended positions of said driven member, whereby said driven member can be locked in a range of extended positions.

7. The actuator of claim 5 wherein said width of said surfaces of said locking element and said abutment is sufficient to provide a range of locking positions of said driven member of at least 0.12 of an inch.

8. The actuator of claim 5 wherein said width of said surfaces of said locking element and said abutment is sufficient to provide a range of locking positions for said driven member between about 0.12 to 0.4 of an inch.

9. The actuator of claim 1 wherein said first cam has a cam surface extending obliquely to the axis of reciprocation of said other member and adapted to engage said cam follower.

10. The actuator of claim 1 wherein said first cam comprises a groove in said other member extending obliquely to the axis of reciprocation thereof and said cam follower is fixed on said floating element.

11. The actuator of claim 9 wherein said cam surface of said first cam is inclined at an acute angle of at least about 30° with respect to the axis of reciprocation of said other member.

12. The actuator of claim 10 wherein said groove is inclined at an acute angle in the range of 30° to 60° with respect to the axis of reciprocation of said other member.

13. The actuator of claim 10 wherein there is a clearance between said cam follower and said groove permitting relative movement therebetween whereby lost motion between said other member and said locking element provides a hammer-like action facilitating release and retraction of said locking element.

14. The actuator of claim 1 wherein said locking element is carried by said driven member.

15. The actuator of claim 2 wherein said locking element is carried by said driven member.

16. The actuator of claim 5 wherein said locking element is carried by said driven member.

17. The actuator of claim 9 wherein said locking element is carried by said driven member.

18. The actuator of claim 2 wherein said first cam comprises a groove in said drive member extending obliquely to the axis of reciprocation of said driven member and adapted to receive said cam follower therein, said locking element is carried by said driven member, said floating element has a body with a cylindrical surface received in a pocket in said locking element for rotation of said body on an axis generally perpendicular to the axes of reciprocation of both said driven member and said locking element, and said body has said cam follower fixedly received thereon and extending into said groove in said drive member.

* * * * *